May 10, 1927.
G. H. GIBSON
1,627,893
FURNACE REGULATION
Original Filed March 5, 1923
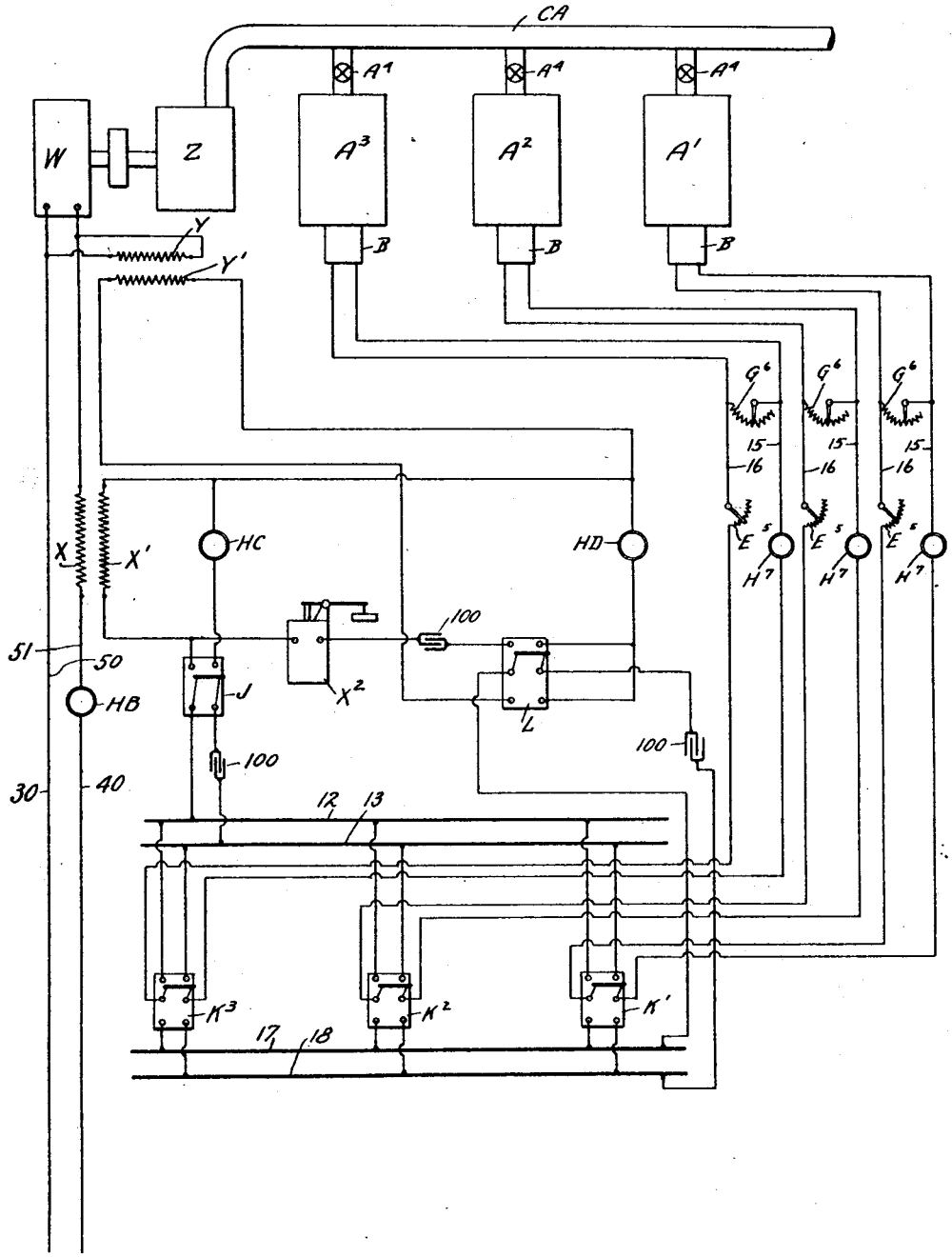
INVENTOR
Geo. H Gibson
BY
John E. Hubbell
ATTORNEY Patented May 10, 1927.

1,627,893

UNITED STATES PATENT OFFICE.

GEORGE H. GIBSON, OF MONTCLAIR, NEW JERSEY.

FURNACE REGULATION.

Original application filed March 5, 1923, Serial No. 622,891. Divided and this application filed July 26, 1924. Serial No. 728,344.

The general object of my present invention is to provide improved apparatus for regulating combustion in furnaces, and the invention was primarily devised and is especially adapted for use in regulating combustion conditions in the boiler furnaces of a power plant in which all, or practically all, of the steam generated is utilized in generating electricity. In accordance with the present invention, I provide such a plant with means automatically responsive to the electric output of the plant for varying the combustion in the boiler furnaces as required to supply the steam needed to maintain such output. In the preferred embodiment of my invention, I provide means which will automatically maintain a predetermined ratio between the aggregate electrical output of the plant and the aggregate rate of combustion of the various boiler furnaces, and which include provisions whereby some of the controlled boiler furnaces may be operated under steady load conditions, notwithstanding variations in the electrical output of the plant, while the remaining boiler furnaces are operated as required to supply the steam not furnished by the boiler furnaces operating under steady load.

The various features of novelty which characterize my invention are pointed out with particularity in the claims annexed to and forming a part of this specification, but for a better understanding of the invention, its advantages, and specific objects attained with it, reference should be had to the accompanying drawing and descriptive matter in which I have illustrated and described a preferred embodiment of my invention.

The single figure of the drawing is a diagrammatic representation of a power plant incorporating the invention.

The power plant diagrammatically illustrated in the drawing comprises a plurality of boiler furnaces $A'$, $A^2$, and $A^3$, delivering steam into a common steam main CA, which supplies steam in turn to a turbine Z driving a single electric alternating current generator W supplying electric energy to mains or distributing conductors 30 and 40, though it will be understood that the single steam motor Z shown might be replaced by a plurality of steam engines or turbines, and the single generator W might be replaced by a plurality of generators supplying current to distributing conductors 30 and 40.

Each boiler furnace has associated with it a combustion regulating mechanism B, adapted to exert a combustion regulating effect on the corresponding furnace varying in accordance with changes in the electric current received by the device B from one or the other of the two sets of bus bars 12 and 13, and 17 and 18. The devices B pertaining to the boiler furnaces $A'$, $A^2$, and $A^3$ are connected to switches $K'$, $K^2$, and $K^3$ respectively. These switches are double throw switches, and each may be adjusted to connect the corresponding device B across the bus bars 12 and 13, or across the bus bars 17 and 18, or to disconnect it from both sets of bus parts. The bus bars 12 and 13, which I call variable load bus bars, are energized, as hereinafter described, in such manner that the current passing to the combustion regulating mechanisms B connected to those bus bars, will be dependent on the electric output of the generator W, and the bus bars 17 and 18 are so energized that the electric energy absorbed from these bus bars by each device B will not vary with the rate of electrical generation, but will tend to maintain a steady rate of combustion in the boiler notwithstanding variations in the electrical output of the plant.

The provisions for energizing the bus bars comprise a current transformer the primary coil X of which is connected in series in the supply conductor 40, while the secondary coil $X'$, of the transformer is connected to the terminals of a switch J, and when the latter is closed, supplies current to the variable load bus bars 12 and 13, the current supplied being proportional in strength to the current flow through the conductors 30 and 40 when bus bars 17 and 18 are not connected to the coil $X'$. The primary winding Y of a constant potential transformer is connected across the conductors 30 and 40, and the secondary winding $Y'$ of this transformer is connected to the terminals of the steady load switch L, so that when the blades of the switch L are in their lower closed position, the steady load bus bars 17 and 18 are directly connected to the terminals of the secondary winding $Y'$ and a constant potential difference is then maintained between the bus bars 17 and 18. When its blades are in their upper closed position the switch L serves to connect the bus bars 17 and 18 to the terminals of the secondary coil X' of the constant current transformer in series with a current regulator X², which may be of any usual or suitable form and serves to maintain a constant rate of current flow to the bus bars 17 and 18 from the secondary coil X'. When the switch blades of the switch L are thus in their upper closed positions, and the switch J is closed, the current supplied to the variable load bus bars 12 and 13 will be less than the current which would be supplied to those bus bars if the switch L were open, or had its blades in their lower closed position, by the amount of current then being supplied to the steady load bus bars 17 and 18. Ammeters HB, HC and HD show the current flow in different portions of the main control system, and advantageously condensers 100 are provided for maintaining a proper power factor in the control system.

The purpose and effect of each device B is to make one or more of the factors controlling combustion in the corresponding boiler furnace vary in proportion to or in accordance with some function of the strength of the electric current flowing through the corresponding conductors 15 and 16 connecting the device to the corresponding switch K', K², or K³. The factors which may thus be controlled include the rate of fuel supply, the rate at which air for the combustion of the fuel is supplied, the rate at which products of combustion are withdrawn, and the combustion chamber pressure. In my prior Patent No. 1,166,758 granted January 4, 1916, I have illustrated one means which may be employed for thus varying the supply of air to support combustion, and in my Patent No. 1,537,044, granted May 5, 1925, on a co-pending application, filed September 22, 1916, I have illustrated other arrangements for making a number of the combustion control factors vary in proportion to the strength of an electric current control force, and in my application, Serial No. 622,891, filed March 5, 1923 of which the present application is a division, I illustrate other provisions for regulating various combustion controlling factors. Advantageously, I include in circuit with each pair of conductors 15 and 16, an individual manually adjustable resistance E⁵, and an individual ammeter H⁷, and preferably a manually adjustable resistance G⁶ is connected in shunt to each mechanism B.

With the switch J closed, and one or more of the three switches K', K², and K³ in the position in which they connect the terminals of the corresponding control mechanism B to the bus bars 12 and 13, and if the switch L is not in its upper closed position, the aggregate of the currents flowing between the bus bars 12 and 13 through the conductors 15 and 16 connected thereto will be proportional to the aggregate rate of electric current generated by the generator W. By manipulating the appropriate resistances E⁵ and G⁶, the current flow between the bus bars 12 and 13 may be divided among the different sets of local control conductors 15 and 16 in any desired ratio. For instance, if all three of the switches K', K², and K³ have their blades in their upper closed position, equal rates of current flow through the three control mechanisms B may be maintained, or different rates of current flow through all three mechanisms B may be maintained, or equal rates of current flow may be maintained through two of the mechanisms B, and a different current flow passed through the third mechanism B. If the three boiler furnaces and their control mechanisms B are all similar in design and proportion, which may or may not be the case, when the control current flowing through any two mechanisms B are equal, the two boiler furnaces will be operated at the same rating, and will carry the same load. If the boilers are of different nominal ratings, but are provided with similar control mechanisms B, the control currents which flow through those mechanisms must be different, of course, to operate the two boilers each at the same percent of its nominal rating.

To operate one or more of the boiler furnaces A', A², and A³ each at a rate which does not fluctuate with the plant load, I connect the mechanism B of each such furnace to the bus bars 17 and 18, by throwing the blades of the corresponding switch K', K², or K³ into their lower closed position.

With the switch blades of the switch L in their upper closed position, and with the blades of the switch K' in their lower closed position, and with the blades of the switches K² and K³ in their upper closed position, for example, the boiler A' will operate with a constant rate of combustion, while the rate of combustion in the boilers A² and A³ will vary in proportion to the variations in the difference between the total electrical load and the portion thereof which should be generated by the use of the steam generated by the boiler A'. This follows from the fact that the current flow to the regulating mechanism B of the boiler A' energized from the steady load bus bars 17 and 18 is maintained constant by the current regulator X² and is unaffected by variations in the current flow through the transformer secondary X'. Inasmuch, however, as the current passing through the control mechanism B energized from the steady load bus bars 17 and 18 comes from the transformer secondary X' the current supplied by the latter to the variable load bus bars 12 and 13 will then not be proportional to the total rate of electrical generation, but to the amount by which that rate exceeds the current which should be generated by steam furnished by the boiler A', when operating with the rate of combustion provided for.

While one or more of the boilers A', A², and A³ are being energized from the steady load bus bars 17 and 18, and one or more are being energized from the variable load bus bars 12 and 13, if the total demand for steam falls below the output of the boilers controlled by the steady load bus bars, one or more of the boilers controlled from the steady load bus bars should be disconnected from the latter, and banked or thrown over onto the variable load bus bars to avoid the generation of steam in excess of the demand.

With the blades of the switch L thrown into their lower closed position, a constant potential difference is maintained between the steady load bus bars 17 and 18 energized from their connection to the secondary Y' of the constant potential transformer. This condition of the control circuits may be desirable in heating a boiler up, preparatory to putting it into operation, such boiler being then connected to the steady load bus bars, while the boilers already in service are then controlled from the variable load bus bars 12 and 13. While the one boiler is thus being fired up, a constant rate of combustion will be maintained therein, save as the rate of combustion may be varied by manipulation of the appropriate resistances E⁵ and G⁶. It is possible also, to operate all of the boilers in service from the steady load bus bars 17 and 18, with the switch L in its lower closed position in which case the current transformer should be cut out of circuit or have its secondary X' short circuited. It is also possible, of course, to operate all of the furnaces in service from the bus bars 12 and 13.

Those skilled in the art will understand that the control system diagrammatically illustrated and described is well adapted for its intended purpose of accurately regulating combustion conditions in each of a battery of boiler furnaces from a single switchboard or control station. The various meters provided make it possible to observe, and if these meters are recording meters, to record the performance of each individual boiler. The flexibility of the control system permits of any desired change in operating conditions. For example, it permits of changes at will in combustion conditions in the battery as a whole, or in any individual boiler furnace which may be desired in practice.

In effect the invention permits of the utilization of the power plant engine or engines and the generators thereby driven as a meter and regulator for producing a control force which is proportional to the load actually carried by the boiler furnaces and is utilized in making the aggregate rate of combustion proportional to the aggregate demand for steam. Various features of invention in apparatus and method disclosed but not claimed herein, are claimed in my said parent application Serial No. 622,891.

While in accordance with the provisions of the statutes, I have illustrated and described the best embodiment of the invention claimed herein now known to me, it will be apparent to those skilled in the art that changes may be made in the form of the apparatus herein illustrated and described without departing from the spirit of my invention as set forth in the appended claims, and that certain features of the invention may sometimes be used with advantage without a corresponding use of other features.

Having now described my invention what I claim as new and desire to secure by Letters Patent is:

1. In a power plant comprising a battery of boiler furnaces and steam engine driven means supplied with steam from said furnaces for delivering alternating current to a distribution circuit, of a current transformer having its primary connected in said circuit, provisions for dividing the secondary current of said transformer into two portions one of which is constant, means for utilizing one of said portions in maintaining a constant rate of combustion in some of said boiler furnaces and means for utilizing the other current portion in regulating the combustion in the remaining furnace or furnaces as required to supply the varying demand for steam by said engine driven means.

2. The combination with a battery of boiler furnaces and electrical current generating means driven by steam supplied by said furnaces, of separate electrically actuated combustion regulators for the different furnaces, means for passing a predetermined fractional portion of the electric current generated to said regulators, and means for dividing the current passed to the different regulating mechanisms among the latter so that a constant current will be supplied to one or more of said regulators and the remaining regulators will receive the balance of said current portion.

3. The combination with a battery of boiler furnaces and alternate current generators, means driven by steam supplied by said furnaces and a distribution circuit supplied with current by said means, separate electrically actuated combustion regulators for the different furnaces, a current transformer having its primary connected in said circuit, means for passing the secondary current from said transformer to said regulators, and means for dividing the current passed to the different regulating mechanisms among the latter so that a constant current will be supplied to one or more of said regulators and the remaining regulators will receive the balance of said secondary current.

4. The combination with a battery of boiler furnaces, alternating current generating means driven by steam supplied by said furnaces and a distribution circuit supplied with current by said means, of two sets of bus bars, a current transformer having its primary connected in said circuit, means for connecting the two sets of bus bars in parallel with one another to the secondary of said transformer, a constant current regulator in the connections between one set of bus bars and said transformer secondary, a separate electrical control combustion regulator for each boiler furnace, and provisions for connecting each regulator optionally to one or the other of the two sets of bus bars.

5. The combination with a battery of boiler furnaces, alternating current generating means driven by steam supplied by said furnaces and a distribution circuit supplied with current by said means, of two sets of bus bars, a current transformer having its primary connected in said circuit, means for connecting one set of bus bars to the secondary of said transformer, a constant current regulator, means for optionally connecting said second set of bus bars to said secondary through said regulator or to a source of constant potential, a separate electrical controlled combustion regulator for each boiler furnace, and provisions for connecting each combustion regulator optionally to one or the other of the two sets of bus bars.

Signed at Philadelphia, in the county of Philadelphia, and State of Pennsylvania, this 24th day of July, A. D. 1924.

GEORGE H. GIBSON.